(12) United States Patent
Obendiek

(10) Patent No.: US 6,497,446 B2
(45) Date of Patent: Dec. 24, 2002

(54) ROOF CONSTRUCTION FOR A MOTOR VEHICLE HAVING A REMOVABLE ROOF

(75) Inventor: Klaus Obendiek, Passau (DE)

(73) Assignee: Edscha LKW-Schiebeverdecke GmbH, Remscheid (DE)

(*) Notice: Subject to any disclaimer, the term of this patent is extended or adjusted under 35 U.S.C. 154(b) by 0 days.

(21) Appl. No.: 09/836,802

(22) Filed: Apr. 17, 2001

(65) Prior Publication Data
US 2001/0042992 A1 Nov. 22, 2001

(30) Foreign Application Priority Data
Apr. 18, 2000 (DE) .......................... 100 19 366

(51) Int. Cl.⁷ ................................. B60J 7/14
(52) U.S. Cl. ............. 296/107.17; 296/121; 296/107.08
(58) Field of Search ................. 296/107.17, 107.16, 296/107.01, 107.2, 107.15, 107.03, 107.07, 107.08, 121, 122, 124, 132, 213, 218, 108, 116

(56) References Cited

U.S. PATENT DOCUMENTS

| | | | |
|---|---|---|---|
| 4,538,852 A | * 9/1985 | Lobo et al. | 296/217 |
| 5,209,544 A | * 5/1993 | Benedetto et al. | 296/107 |
| 5,758,923 A | * 6/1998 | Kolb | 296/107 |
| 5,769,483 A | * 6/1998 | Danzl et al. | 296/107 |
| 5,884,964 A | * 3/1999 | Roeper et al. | 296/189 |
| 5,967,591 A | 10/1999 | Muehlhausen | |
| 6,010,178 A | * 1/2000 | Hahn et al. | 296/107.08 |
| 6,019,416 A | * 2/2000 | Beierl | 296/107.17 |

FOREIGN PATENT DOCUMENTS

| | | |
|---|---|---|
| DE | 4203228 | 8/1993 |
| DE | 19714139 | 10/1998 |
| DE | 19741264 | 3/1999 |
| DE | 19805477 | 8/1999 |
| DE | 19635536 | 10/1999 |

\* cited by examiner

Primary Examiner—D. Glenn Dayoan
Assistant Examiner—G Blankenship
(74) Attorney, Agent, or Firm—Davidson, Davidson & Kappel, LLC

(57) ABSTRACT

A roof construction for a motor vehicle having a removable roof, includes a first, front hard roof part, a main bearing fixed on the motor vehicle body, a first, articulated connection, the first, front hard roof part being connected via the first, articulated connection to the main bearing, the first, front hard roof part being pivotable from a closed position into a lowered position in a trunk by means of the first, articulated connection, a second roof part containing a rear window, a second, articulated connection, the second, articulated connection being arranged pivotably outside the first, articulated connection on the same main bearing, the second roof part being pivotable from a closed position into a lowered position in the trunk via the second, articulated connection, the first, front hard roof part being arranged in its lowered position above the second roof part, and a loading area for loading purposes remaining below the second roof part.

16 Claims, 8 Drawing Sheets

ROOF CONSTRUCTION FOR A MOTOR VEHICLE HAVING A REMOVABLE ROOF

FIELD OF THE INVENTION

The invention relates to a roof construction for a motor vehicle having a removable roof, comprising a first, front hard roof part; a main bearing fixed on the motor vehicle body; a first, articulated connection; said first, front hard roof part being connected via said first, articulated connection to said main bearing; said first, front hard roof part being pivotable from a closed position into a lowered position in a trunk by means of said first, articulated connection; a second roof part containing a rear window; a second, articulated connection; said second roof part being pivotable from a closed position into a lowered position in the trunk via said second, articulated connection; said first, front hard roof part being arranged in its lowered position above said second roof part.

DESCRIPTION OF THE PRIOR ART

German Patent No. DE 196 35 536 C1 describes a roof construction in which an open passenger car is designed with a two-part, collapsible fixed roof in which a rear roof part, which contains the rear window, is lowered in a manner first rotated through 180°, in the floor region of a storage space and in which the front roof part is lowered on the latter. Such packing is extremely bulky and takes up a considerable amount of storage space. Moreover, the front roof part is not suitable as a covering for the storage space and so a separate covering has to be provided. For the drive of the two roof parts a separate drive is required in each case and these drives have to be coordinated with each other using a complicated sensor arrangement. Finally, because the front roof part is removed flat, the roof construction requires a retractable roll bar, since a static roll bar would impede the lowering of the roof.

German Patent No. DE 198 05 477 C1 describes a hard top vehicle roof comprising a front roof part, a rear roof part, which is provided with a fixed rear window, and main links which are fastened to the vehicle body and are intended for pivoting and lowering the rear roof part into a trunk of the vehicle, levers which are connected to the front roof part being fixed on the rear roof part and being used to pivot the front roof part over the rear roof part and lower it into the trunk. Since the front roof part is articulated by means of its levers on the rear roof part, the sequence of movement of the front roof part relative to the rear roof part and to the vehicle body is subject to restrictions. Furthermore, provision is not made for a loading area to remain below the rear roof part lowered into the trunk.

German Patent Application No. DE 197 41 264 A1 describes a passenger car having a rigid roof part and a rear window part which can be brought, in a manner such that they can move against each other, from a closed position into an open position in which the parts are lowered into a rear region of the passenger car. In this case, the roof part is articulated on the vehicle body via a four-bar linkage, whereas the rear part is articulated at one end on the four-bar linkage and at the other end is mounted in a manner such that it can pivot about an articulation arranged in the rear region of the vehicle. Provision is not made for both parts to be retractable into a trunk of the vehicle.

German Patent No. DE 197 14 139 C2 describes a convertible vehicle roof having a fixed rear element and a fixed roof element which, in the closed position of the roof, is arranged in front of the rear element, the rear element being moveable from the rear over the roof element during an opening movement of the roof. In the opened position of the roof, the rear element is arranged over the roof element. This arrangement of roof element and rear element in the opened position of the roof does not correspond to that of the present invention where the second roof part, which contains the rear window is lowered below the first, front hard roof part.

German Patent No. DE 42 03 228 C2 describes a vehicle roof having a front roof part and a rear roof part which can be moved into a storage space in the rear part of the vehicle in order to open up a convertible-like roof opening. In this case, the front roof part and the rear roof part are moved by one drive, using a common four-bar linkage, and a further rear window is moved by a second drive. A common articulation on a main bearing of all of the parts necessary for moving the roof into the opened position is not provided.

SUMMARY OF THE INVENTION

It is an object of the present invention to specify a roof construction enabling, when the roof has been lowered, a compact arrangement of the roof parts in the trunk.

According to the present invention, this object is achieved by a roof construction for a motor vehicle having a removable roof, comprising a first, front hard roof part, a main bearing fixed on the motor vehicle body, a first, articulated connection, said first, front hard roof part being connected via said first, articulated connection to said main bearing, said first, front hard roof part being pivotable from a closed position into a lowered position in a trunk by means of said first, articulated connection, a second roof part containing a rear window, a second, articulated connection, said second, articulated connection being arranged pivotably outside said first, articulated connection on the same main bearing, said second roof part being pivotable from a closed position into a lowered position in the trunk via said second, articulated connection, said first, front hard roof part being arranged in its lowered position above said second roof part, and a loading area for loading purposes remaining below said second roof part.

If the first roof part is designed with C-struts fitted to it, the loading area laterally between the C-struts is restricted, but this does not constitute a significant limitation.

With the roof removed, the roof construction according to the present invention enables stacking of the first and second roof parts, in which the curved profile of the two roof parts runs essentially in the same direction and therefore the additional storage space required because of the curvature or transverse bending in the curved profile of the two roof parts has only to be made available once on account of the stackability. It is thereby advantageously possible to move the first, front hard roof part rearward, as seen in the direction of travel, in a relatively flat manner and similarly to allow the rear, second roof part to slide flat into the trunk of a motor vehicle. For this purpose, the trunk can expediently be opened rearward via a pivoting joint arranged in the region of its lock provided at the rearward end.

Since the second roof part, which essentially comprises the rear window, is lowered synchronously with the moving of the first roof part, the first roof part can be pulled down rearward from the cowl in a predominantly horizontal movement without colliding with the second roof part, and thus makes possible a simple locking arrangement to the cowl.

It is furthermore possible to realize the comparatively simple sequence of movements with a low outlay by the fact that one drive per side drives both roof parts. By this means, it is possible, in particular, to synchronize the two roof parts mechanically without separate sensor arrangements for detecting the position of the two parts, with the result that the sequence of movement is always coordinated and also, in the event of being actuated manually in emergency mode, is coupled in such a manner that the two roof parts do not impede each other. At the same time, the coupling secures the mutual locking arrangement of the two articulated connections.

A seven-bar linkage is preferably provided in each case for the drive of the first roof part and a four-bar linkage for the drive of the second roof part. The seven-bar linkage is a four-bar linkage in which the articulation on the vehicle body of one of the two links can be changed via a control link which is articulated on the vehicle body, the change, because of a change in position of the other link, being transmitted via a coupling rod. The other three articulations are therefore the two articulations of the coupling link on the two links and the articulation of the control link on a main bearing on the vehicle body. The configuration of a seven-bar linkage makes it advantageously possible to provide a rapid sequence of movement without high acceleration values being reached for this—unlike in the case of a four-bar linkage.

The two links of the four-bar linkage for the second roof part are articulated pivotably at one end likewise on a main bearing which is fixed on the vehicle body, preferably the same main bearing as for the seven-bar linkage, and at the other end on a stop part for the second roof part or a frame for the rear window. The seven-bar linkage and the four-bar linkage then define a respective pivoting kinematic arrangement for the first roof part and for the second roof part, said pivoting kinematic arrangement being configured in accordance with the two end positions of the roof parts.

In order to drive the two roof parts via the seven-bar linkage and the four-bar linkage, a hydraulic drive is provided which preferably comprises a piston-cylinder unit whose piston rod engages in an articulated manner with a lever protruding rigidly from one of the links of the kinematic arrangement. To open the roof, the piston rod is retracted and to close it is extended, with the result that the larger piston surface is ready for the larger forces required in order to raise the two roof parts.

The two links of the seven-bar linkage are preferably connected to each other via a coupling rod and a control link, which is mounted on the main bearing which is fixed on the vehicle, in such a manner that the coupling rod drives the control link about its articulation on the main bearing, the control link bearing, likewise eccentrically with respect to its mounting, the articulation of the other link of the seven-bar linkage and therefore first of all pulling said link and causing a tilting movement which hardly raises the front edge of the first roof part enabling the latter to be brought in a simple manner out of interference with the boundaries in the region of the passenger cell roof. It is therefore also possible for the first roof part to travel around a roll bar of the motor vehicle. The first roof part is not pivoted out to a very high extent and so a small amount of opening can be provided for the rear lid. The four-bar linkage displaces the rear window and the second roof part synchronously into the trunk. The first roof part is lowered relatively far forward into the vehicle body and rotated into an end position, as a result of which the aperture of the rear lid can be of correspondingly smaller dimensions, and further a uniform speed without relatively great changes can be set.

When the roof has been retracted, the C-struts in the trunk protrude into a region between the rear light and wheel housing, while the horizontal region of the roof part is arranged entirely in the vicinity of the trunk lid. The second roof part is arranged below the flat part very close below the first roof part. By this means, in the region between the two C-struts in the trunk, a loading space is produced which allows a deep loading option extending to below the second roof part. This storage space is advantageously also available during the lowering and re-erection of the hard roof, which means that this region does not have to be unloaded before the roof is pivoted.

In the lower region of the rear window or of the second roof part, a continuous water channel is provided which protrudes laterally over the second roof part, so that a separate, further joint gap before the transition to the vehicle body is omitted.

Further advantages and features of the invention emerge from the following description.

The invention is explained in greater detail below with reference to a preferred exemplary embodiment of the invention and using the attaching drawings.

DETAILED DESCRIPTION OF A PREFERRED EMBODIMENT

FIGS. 1 to 7 show part of a motor vehicle, which is denoted as a whole by the reference number 1, with a removable roof which is designed as a hard shell roof or a hard top and comprises a first, front roof part 2 and a second, rear roof part 3.

The front roof part 2 is connected via a first, articulated connection, which is designed as a seven-bar linkage 4, to a main bearing 5 which is fixed on the vehicle body. The rear roof part 3 is connected by means of a four-bar linkage 6 as an articulated connection to the main bearing 5 which is fixed on the vehicle body. The first roof part furthermore has C-struts 7 adjoined to it which essentially laterally enclose the second roof part 3. The second roof part in the present case is a framed rear window.

The drive of the kinematic arrangement defined by the seven-bar linkage 4 and the four-bar linkage 6 takes place via a hydraulic piston-cylinder unit 8 whose piston rod 9 engages on a projection 10 of a first link 14 of the seven-bar linkage in order to transmit, when the piston rod 9 is pulled back, a pivoting movement to the seven-bar linkage 4 and to the four-bar linkage 6.

Figure 8:
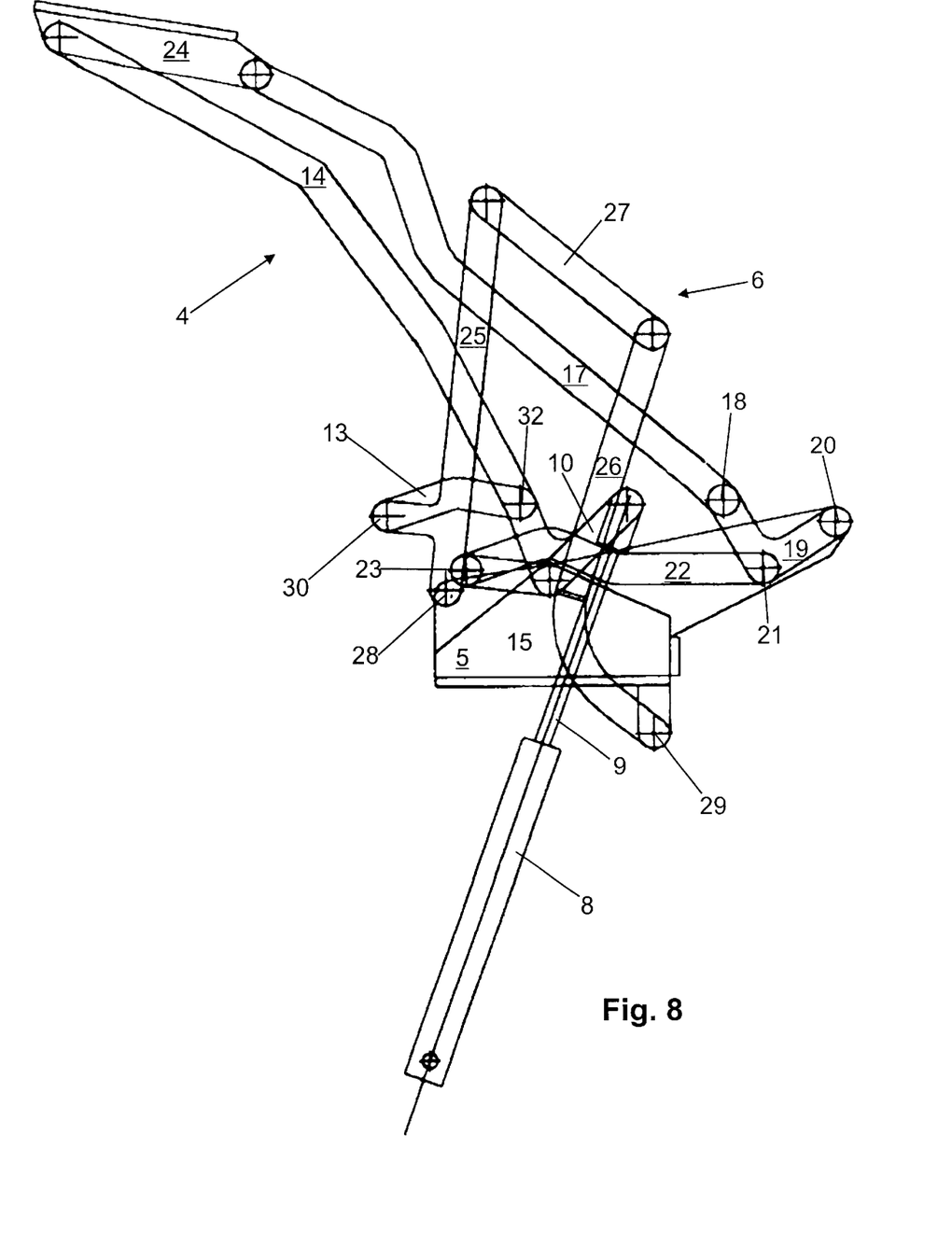
FIG. 8 shows the linkage mechanism for the kinematic arrangement of the roof construction in the closed position as in FIG. 1.

The first link 14 of the seven-bar linkage 4 is mounted on the main bearing 5 via a joint 15. The second link 17 of the seven-bar linkage 4 is connected via a joint 18 to a control link 19 which is connected in an articulated and pivoting manner to the main bearing 5 via a joint 20. The control link 19 has an approximately V-shaped design, the joints 18 and 20 being arranged in each case in one of the three corners of the control link 19. A further joint 21 is provided in the third corner and pivotably supports a coupling rod 22 whose other end is mounted via a joint 23 in an articulated manner on a further extension of the first link 14 of the seven-bar linkage 4. The other two ends of the first link 14 and of the second link 17 of the first four-bar linkage are arranged pivotably on a stop part 24 which is connected in turn to the front, first roof part 2.

The four-bar linkage 6 comprises a first link 25 and a second link 26, which links are arranged in an articulated manner on a stop part 27 for the second roof part 3 and are arranged pivotably in the main bearing 5 via joints 28, 29. A coupling link 13 is connected to an extension of the first link 25 of the four-bar linkage 6 via a joint 30 and is designed so as to transmit a pivoting force from the seven-bar linkage 4 to the four-bar linkage 6. The coupling link 13 is connected to the first link of the seven-bar linkage 4 via a joint 32 which is arranged above the joint 15. Details of the kinematic arrangement in the closed starting position can be readily seen in FIG. 8.

Figure 1:
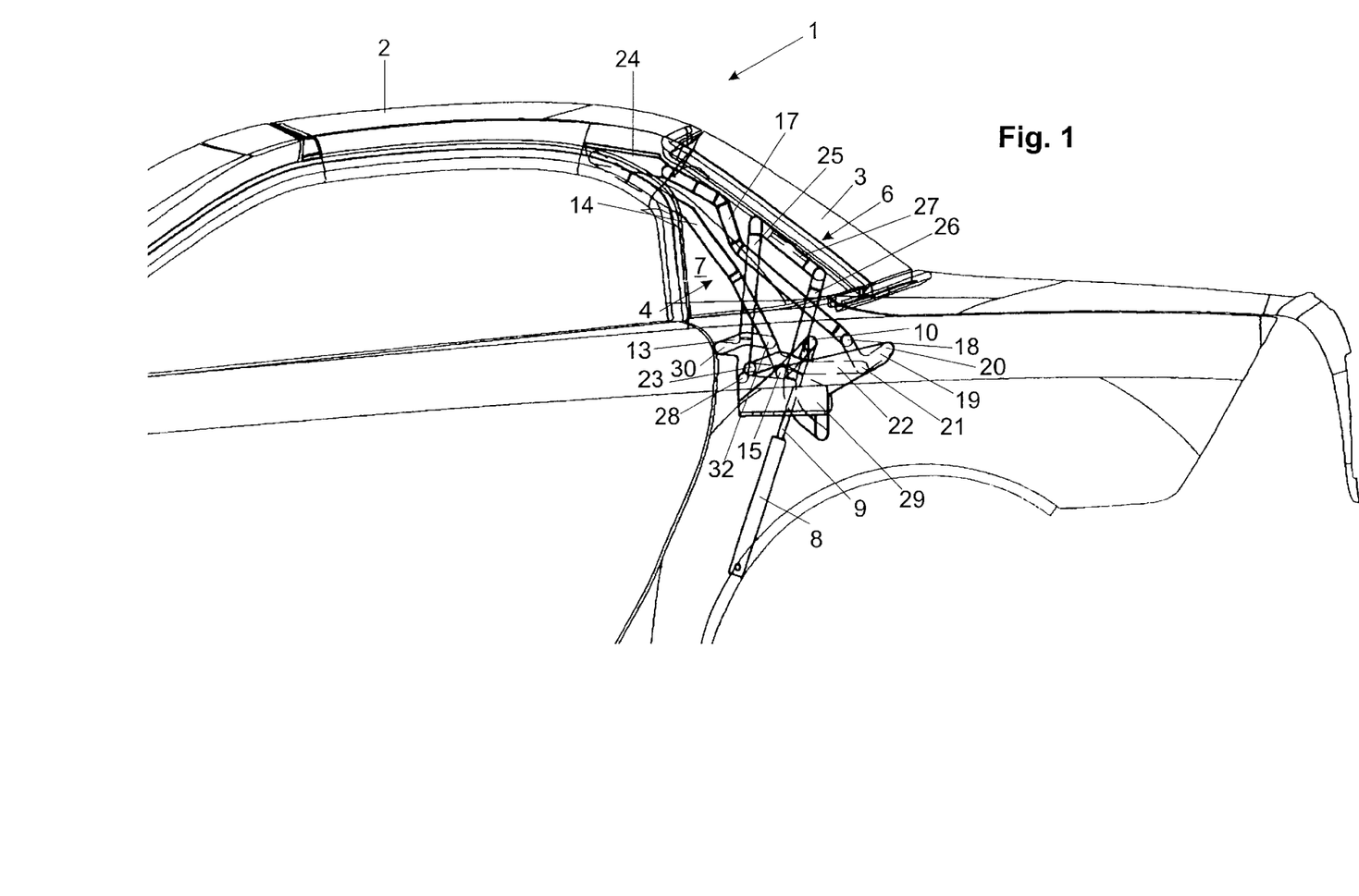
FIG. 1 shows a motor vehicle with an exemplary embodiment of a roof construction according to the invention in the closed position.
Figure 2:
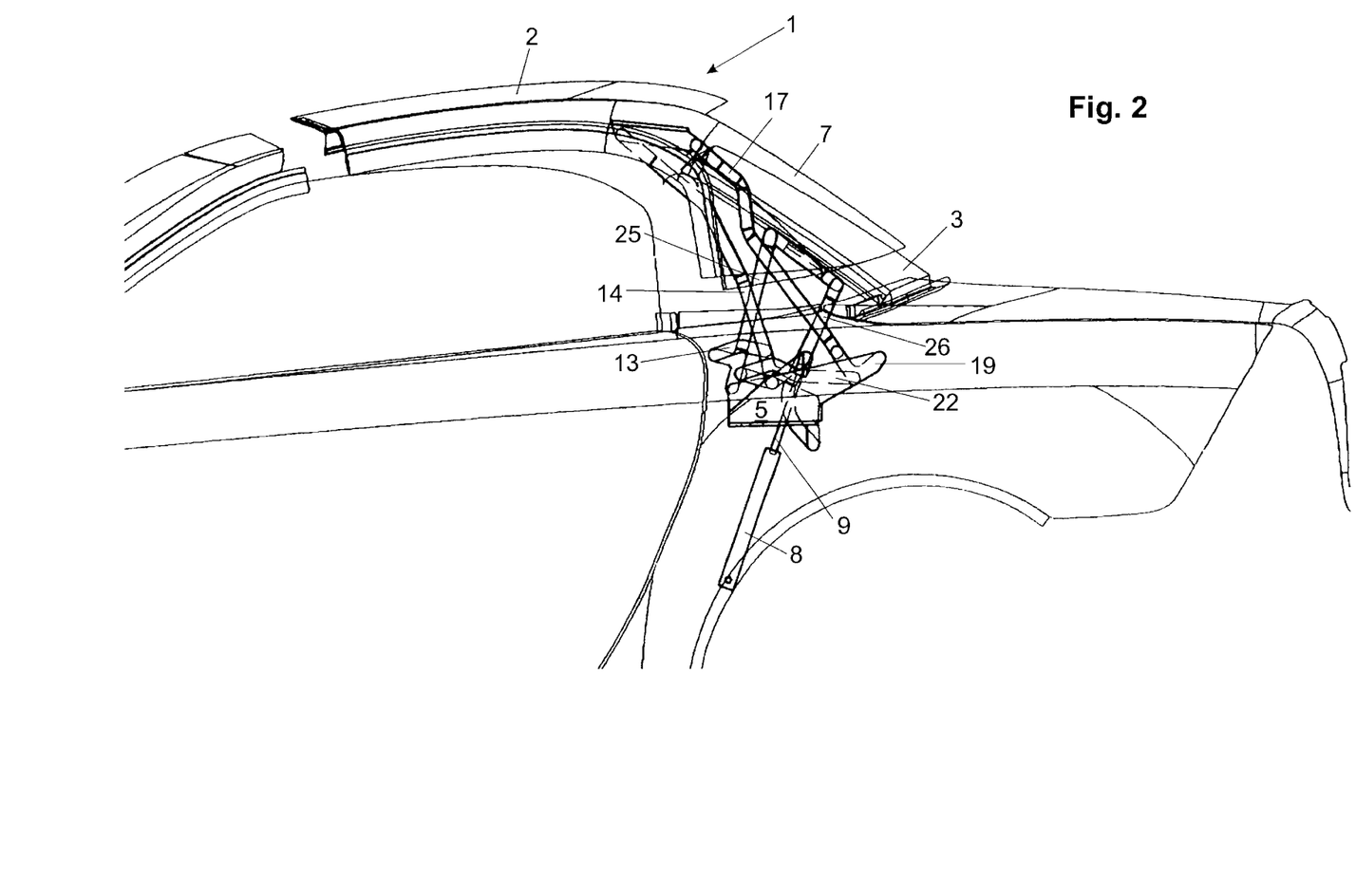
FIG. 2 shows the roof construction from FIG. 1 during lowering of the roof after a first substep.
Figure 3:
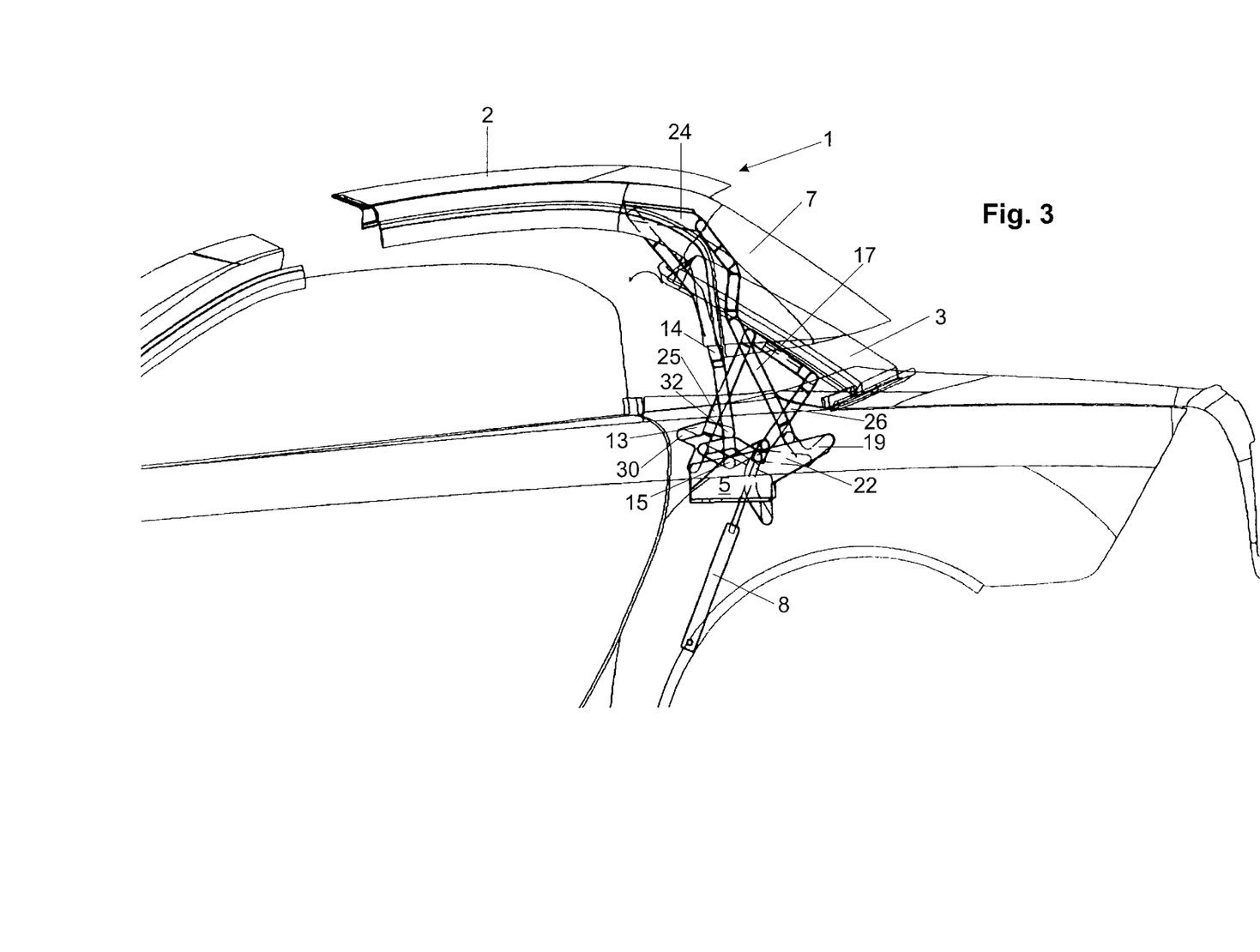
FIG. 3 shows the roof construction from FIG. 1 during lowering of the roof after a second substep.
Figure 4:
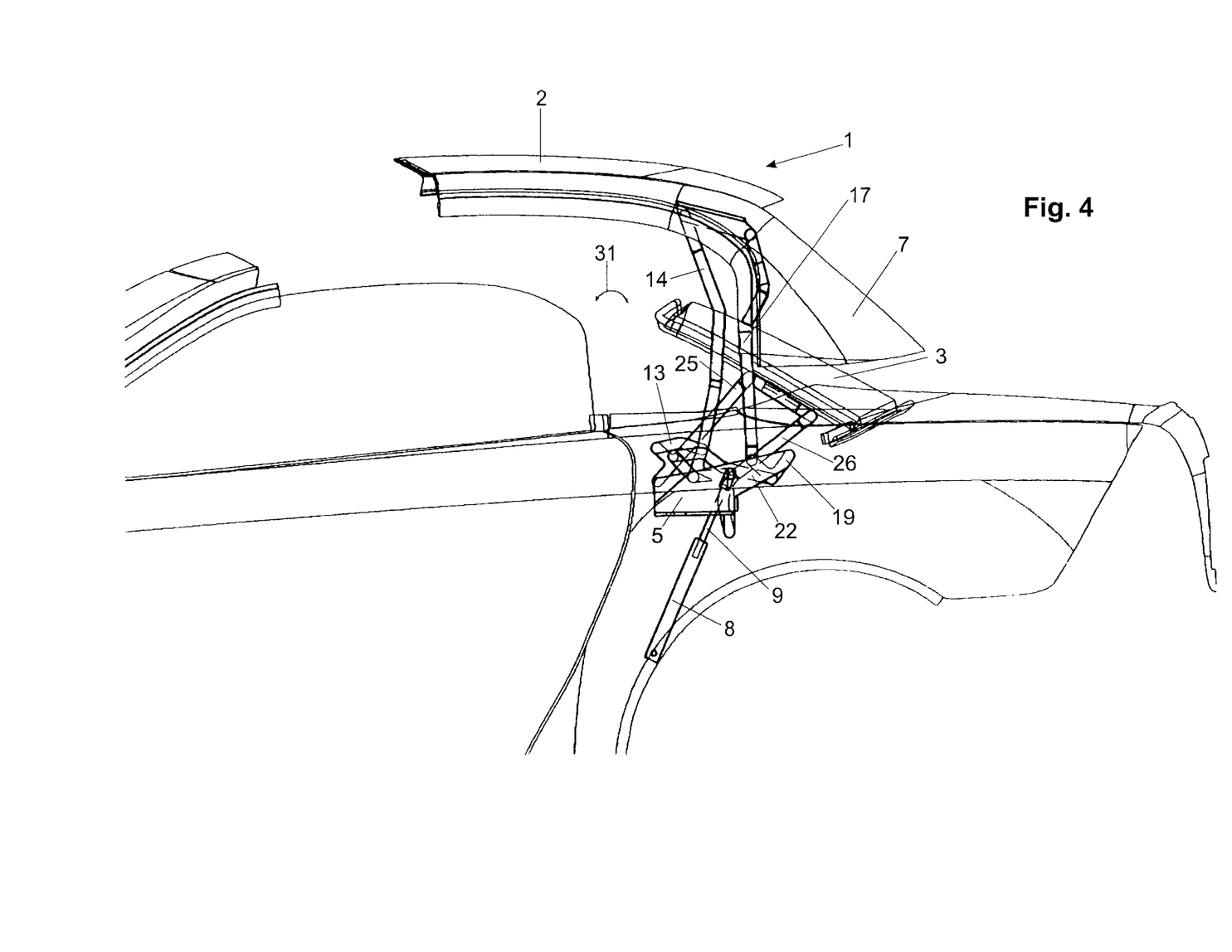
FIG. 4 shows the roof construction from FIG. 1 during lowering of the roof after a third substep.
Figure 5:
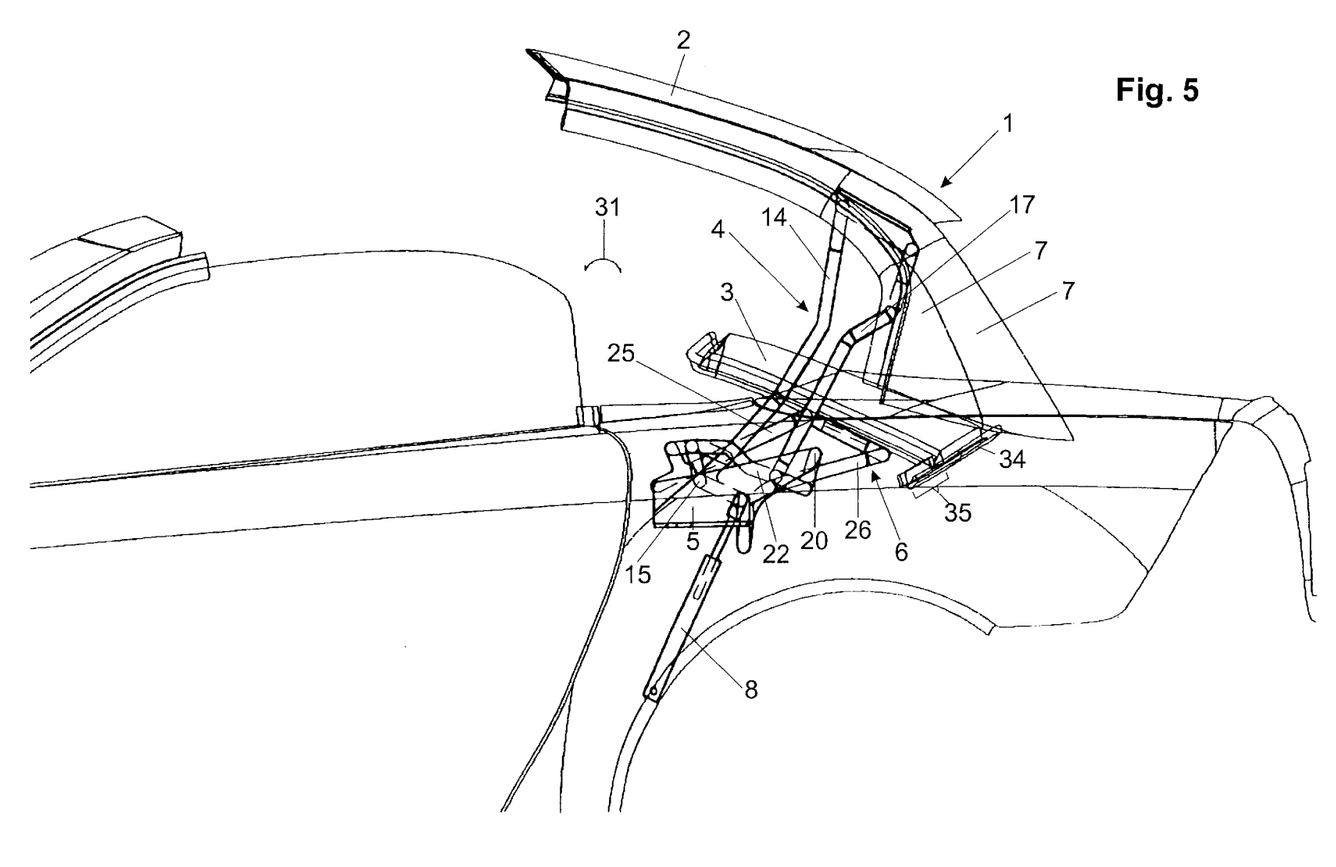
FIG. 5 shows the roof construction from FIG. 1 during lowering of the roof after a fourth substep.
Figure 6:
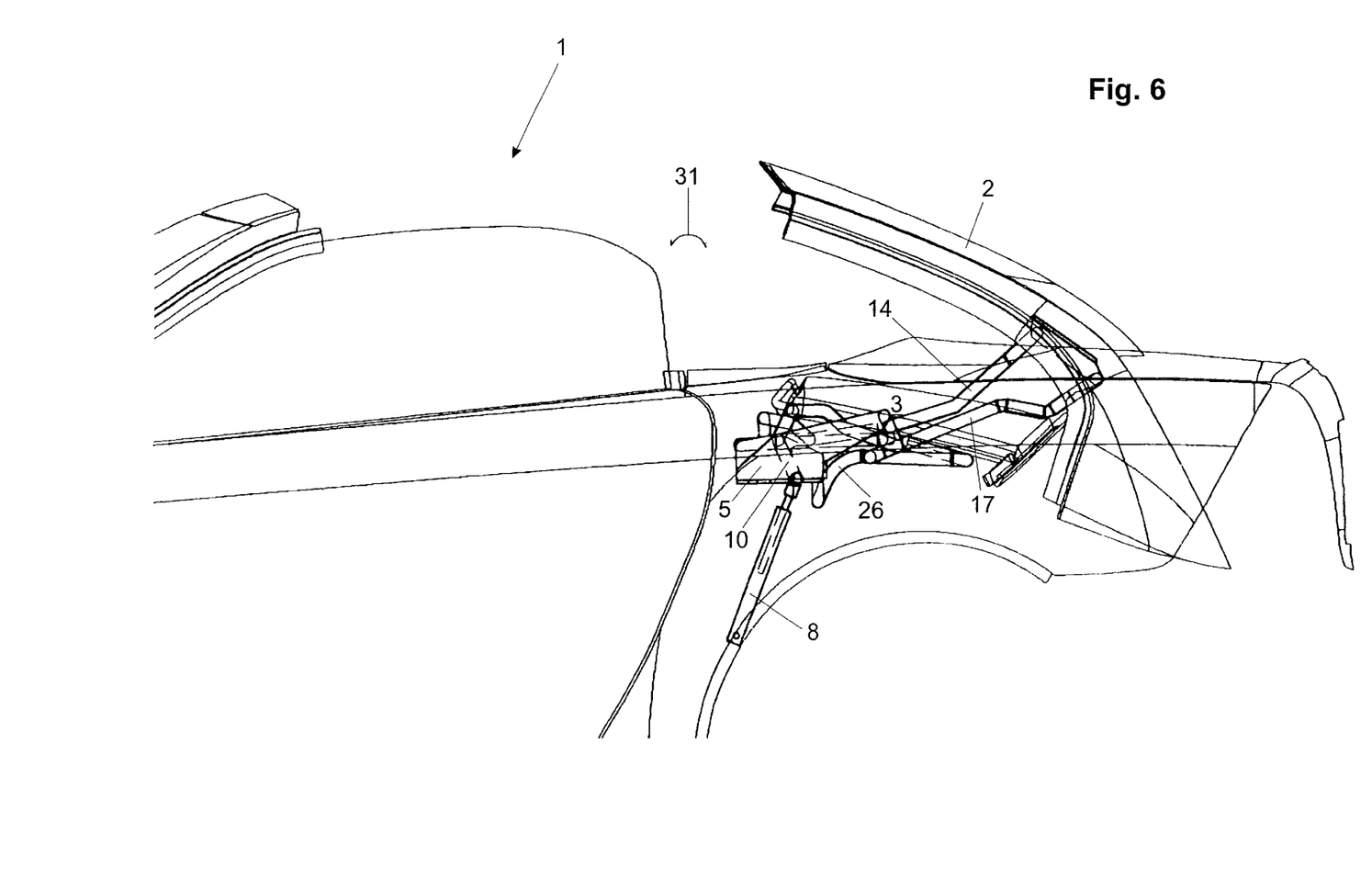
FIG. 6 shows the roof construction from FIG. 1 during lowering of the roof after a fifth substep.

If, starting from the position illustrated in FIG. 1, the piston rod 9 is retracted, the tension on the extension 10 causes a simultaneous lowering of the second roof part 3 and raising of the first roof part 2 into the position shown in FIG. 2, the second roof part 3 being lifted off from a roll bar 31 which spans the motor vehicle 1 in the transverse direction.

In FIGS. 2 to 6, the gradual pivoting of the second roof part 3 along a parabolic curved path into the trunk takes place in a comparatively raised plane which leaves open a considerable loading area downward as far as the floor of the trunk. It can be seen, for example in FIG. 5, that a water channel 34 is formed on the rear edge of the second roof part 3 and protrudes by a respective edge region 35.

At the same time, the seven-bar linkage 4 is initially pulled away horizontally (FIGS. 2 and 3) via the extension 10 from its closed position in FIG. 1 and is raised just slightly at the rear end by the second link 17 of the seven-bar linkage 4 and moved beyond the roll bar 31.

The pivoting of the extension 10 causes the first link 14 of the sevenbar linkage 4 to be pressed rearward as is the coupling rod 22, which in turn pulls the second link 17 of the seven-bar linkage 4 downward via the control link 19, so that the front roof edge of the first roof part 2 is raised slightly. This ensures a parallel movement as the roof part 2 start to move, the parallel movement being required in order to ensure that the front region of a centering pin which protrudes forward is moved out of the cowl.

It can be seen that as the first roof part 4 is lowered it adopts a slightly sloping inclination so as to penetrate, with the ends of the C-struts 7 in front, into the corners of the trunk (FIGS. 5 and 6) in order, in the finally lowered position (FIG. 7), to come to rest with the flat part of the first roof part on the second roof part and directly below the plane of the trunk lid. Nevertheless, between the C-struts as a lateral boundary and the second roof part as an upper boundary, there remains a considerable storage space capacity which can actually be used and, as can be seen above, also does not need to be cleared out during the lowering of the roof parts.

Figure 7:
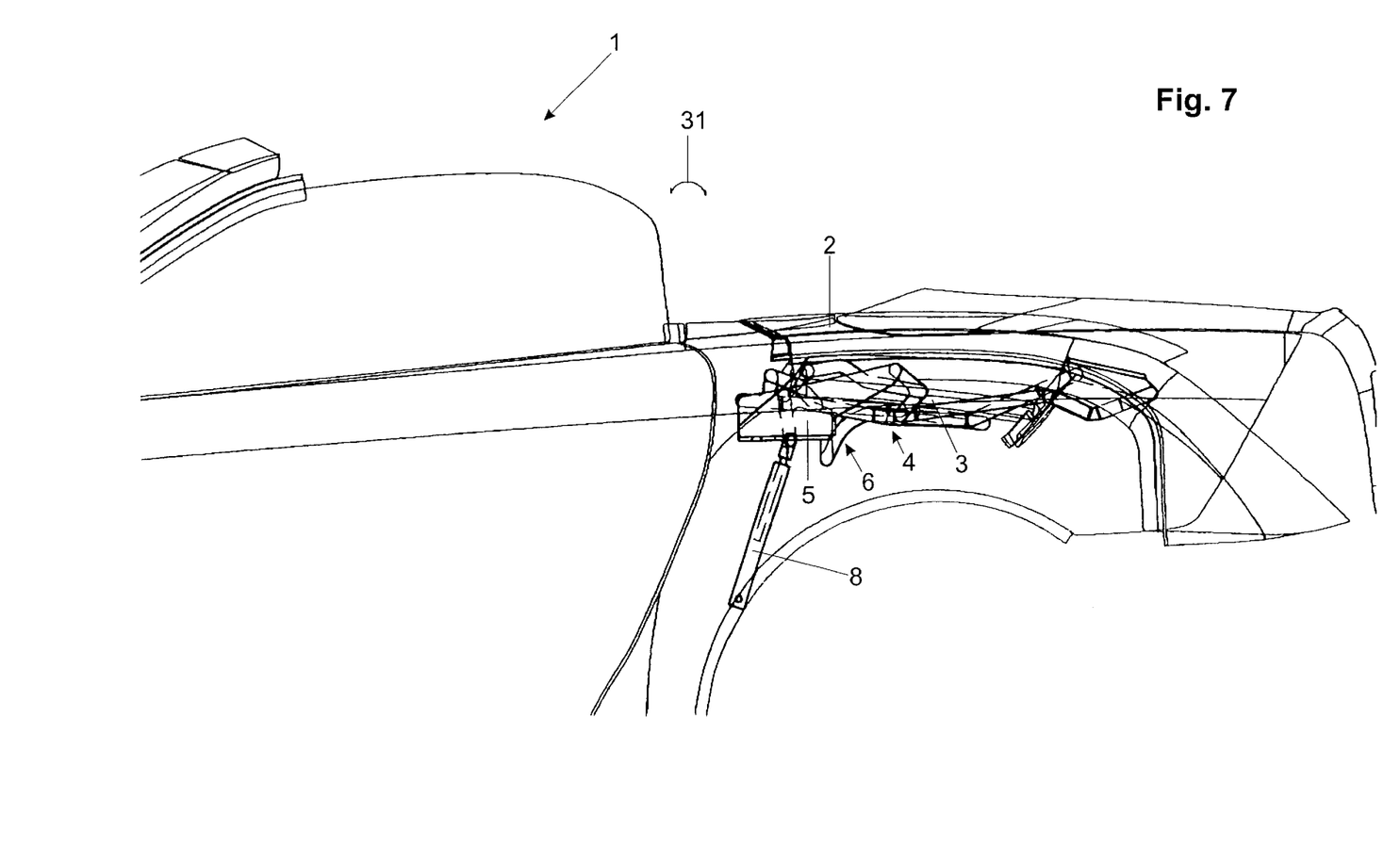
FIG. 7 shows the roof construction from FIG. 1 with a lowered roof.

Re-raising the roof takes place by extension of the piston rod 9 in a corresponding opposite manner from the position in FIG. 7 to the position in FIG. 1.

What is claimed is:

1. A roof construction for a motor vehicle having a removable roof, comprising:
    a first, front hard roof part,
    a main bearing fixed on a motor vehicle body,
    a first, articulated connection,
    said first, front hard roof part being connected via said first, articulated connection to said main bearing,
    said first, front hard roof part being pivotable from a closed position into a lowered position in a trunk via said first, articulated connection,
    a second roof part containing a rear window,
    a second, articulated connection,
    said second, articulated connection being arranged pivotably outside said first, articulated connection on the same main bearing,
    said second roof part being pivotable from a closed position into a lowered position in the trunk via said second, articulated connection,
    said first, front hard roof part being arranged in its lowered position above said second roof part, and
    a loading area for loading purposes remaining below said second roof part, the first roof part and the second roof part having a curved profile facing in the same direction.

2. The roof construction as claimed in claim 1, wherein the first roof part is lowered into its lowered position with its upper side upward.

3. The roof construction as claimed in claim 1, wherein the second, articulated connection is a four-bar linkage.

4. The roof construction as claimed in claim 1, wherein the first, articulated connection is a seven-bar linkage.

5. The roof construction as claimed in claim 3, wherein the first, articulated connection is a seven-bar linkage and the four-bar linkage and said seven-bar linkage are connected kinematically via a coupling link.

6. The roof construction as claimed in claim 4, wherein a first link of the seven-bar linkage is coupled via a coupling rod and a control link to a second link of the seven-bar linkage.

7. The roof construction as claimed in claim 6, wherein the control link has its point of articulation fixed on the vehicle body.

8. The roof construction as claimed in claim 1, wherein the first roof part travels around a roll bar of the motor vehicle.

9. The roof construction as claimed in claim 1, wherein the first roof part, on being moved into the closed position, is fixed in a top of a windshield frame by a pin protruding from the first roof part in the direction of travel.

10. The roof construction as claimed in claim 1, wherein the first roof part is moved synchronously with the second roof part.

11. The roof construction as claimed in claim 1, wherein the second roof part comprises a frame with a rear window arranged in the frame.

12. The roof construction as claimed in claim 1, wherein the first roof part is designed with C-struts fitted to it, and wherein the loading area remains for loading purposes between the C-struts below the second roof part.

13. The roof construction as claimed in claim 12, wherein, in the lowered position, the C-struts fitted to the first roof part are arranged in the trunk in a region between the rear light and wheel housing.

14. The roof construction as claimed in claim 1, wherein the second roof part has a laterally protruding water channel.

15. A roof construction for a motor vehicle having a removable roof, comprising:
- a first, front hard roof part,
- a main bearing fixed on a motor vehicle body,
- a first, articulated connection,
- said first, front hard roof part being connected via said first, articulated connection to said main bearing,
- said first, front hard roof part being pivotable from a closed position into a lowered position in a trunk via said first, articulated connection,
- a second roof part containing a rear window,
- a second, articulated connection,
- said second, articulated connection being arranged pivotably outside said first, articulated connection on the same main bearing,
- said second roof part being pivotable from a closed position into a lowered position in the trunk via said second, articulated connection,
- said first, front hard roof part being arranged in its lowered position above said second roof part, and
- a loading area for loading purposes remaining below said second roof part, the second articulated linkage being a four-bar linkage.

16. A roof construction for a motor vehicle having a removable roof, comprising:
- a first, front hard roof part,
- a main bearing fixed on a motor vehicle body,
- a first, articulated connection,
- said first, front hard roof part being connected via said first, articulated connection to said main bearing,
- said first, front hard roof part being pivotable from a closed position into a lowered position in a trunk via said first, articulated connection,
- a second roof part containing a rear window,
- a second, articulated connection,
- said second, articulated connection being arranged pivotably outside said first, articulated connection on the same main bearing,
- said second roof part being pivotable from a closed position into a lowered position in the via said second, articulated connection,
- said first, front hard roof part being arranged in its lowered position above said second roof part, and
- a loading area for loading purposes remaining below said second roof part, the first roof part being designed with C-struts fitted to it, the loading area remaining for loading purposes between the C-struts below the second roof part.

* * * * *